(12) United States Patent
Cankaya et al.

(10) Patent No.: US 8,351,337 B2
(45) Date of Patent: Jan. 8, 2013

(54) TOOLS THAT FACILITATE DIAGNOSTICS FOR MOBILE BACKHAUL NETWORKS

(75) Inventors: Hakki Cankaya, Dallas, TX (US); Kamakshi Sridhar, Plano, TX (US); Peter Roberts, Stittsville (CA)

(73) Assignee: Alcatel Lucent, Paris (FR)

( * ) Notice: Subject to any disclaimer, the term of this patent is extended or adjusted under 35 U.S.C. 154(b) by 167 days.

(21) Appl. No.: 12/266,705

(22) Filed: Nov. 7, 2008

(65) Prior Publication Data

US 2010/0118711 A1 May 13, 2010

(51) Int. Cl.
*G01R 31/08* (2006.01)
(52) U.S. Cl. .......................... 370/244; 370/225; 370/255
(58) Field of Classification Search .................. 370/225, 370/244, 255
See application file for complete search history.

(56) References Cited

U.S. PATENT DOCUMENTS

| | | | | |
|---|---|---|---|---|
| 7,808,919 | B2 * | 10/2010 | Nadeau et al. ................. | 370/248 |
| 2005/0068933 | A1 * | 3/2005 | Kokkonen et al. ............ | 370/349 |
| 2007/0025241 | A1 * | 2/2007 | Nadeau et al. ................. | 370/229 |
| 2008/0037526 | A1 * | 2/2008 | Dong ............................ | 370/352 |
| 2008/0089227 | A1 * | 4/2008 | Guichard et al. ............. | 370/228 |
| 2008/0095061 | A1 * | 4/2008 | Hua et al. ...................... | 370/248 |
| 2008/0175234 | A1 * | 7/2008 | Li ................................... | 370/389 |
| 2008/0240101 | A1 * | 10/2008 | Shao et al. ..................... | 370/392 |
| 2009/0010182 | A1 * | 1/2009 | Tochio ........................... | 370/254 |
| 2009/0113070 | A1 * | 4/2009 | Mehta et al. .................. | 709/238 |
| 2009/0154453 | A1 * | 6/2009 | Shah et al. .................... | 370/389 |
| 2009/0245261 | A1 * | 10/2009 | Khan et al. ............... | 370/395.53 |
| 2010/0238791 | A1 * | 9/2010 | Duncan et al. ................ | 370/216 |

FOREIGN PATENT DOCUMENTS

WO    WO 2007/101140 A2 *   9/2007

* cited by examiner

*Primary Examiner* — Jason Mattis
(74) *Attorney, Agent, or Firm* — Garlick & Markison; Holly L. Rudnick

(57) ABSTRACT

A diagnostic tool is provided for calculating the availability of multi-segment pseudowires within an internet protocol (IP)-based mobile backhaul network. A control message is transmitted from an originating node towards a destination node within the IP-based mobile backhaul network over a primary multi-segment pseudowire and a secondary multi-segment pseudowire. From the response messages received from intermediate nodes positioned between the network node and the destination node along the primary multi-segment pseudowire and the secondary multi-segment psuedowire, the originating node determines the identities of each of the intermediate nodes, and calculates a respective individual availability of the primary multi-segment pseudowire and the secondary multi-segment pseudowire.

20 Claims, 4 Drawing Sheets

TOOLS THAT FACILITATE DIAGNOSTICS FOR MOBILE BACKHAUL NETWORKS

BACKGROUND OF THE INVENTION

1. Technical Field of the Invention

The present invention relates in general to network diagnostic tools, and in particular, to diagnostic tools for mobile backhaul networks.

2. Description of Related Art

The wireless infrastructure market is migrating towards 3G, replacing traditional Base Transceiver Station (BTS) and Base Station Controller (BSC) elements with University Mobile Telecommunications System (UMTS) Node B and Radio Network Controller (RNC) network elements. With the migration towards 3G underway, the T1/E1 links traditionally connecting the BTS to the BSC are also being replaced with packet switched mobile backhaul networks that provide connectivity between the Node B and the RNC. To deliver traditional T1/E1 voice and data service across the new Internet Protocol (IP)-based mobile backhaul networks, pseudowires are often used. A pseudowire is an emulation of a native service, such as T1/E1, over a packet switched network (PSN), such as an IP-based Multi Protocol Label Switching (MPLS) network. Pseudowires emulate the operation of carrying the native service by segmenting, adapting and encapsulating the T1/E1 traffic into packets of the format required by the PSN.

The term "pseudowire" (PW) typically refers to a PSN tunnel that both originates and terminates on the same PSN. Thus, a PW passes through a maximum of one PSN tunnel between the originating and terminating Provider Edge (PE) routers. To extend the pseudowire service through multiple PSN tunnels (or multiple network segments), multi-segment pseudowires (MSPW) are used. A MSPW is a static or dynamically configured set of two or more contiguous PW segments that behave and function as a single point-to-point PW. Thus, a MSPW can be considered a single PW that is segmented into a number of concatenated hops.

In single-segment pseudowire (SSPW) applications, protection for the PW is provided by the PSN layer. This may be, for example, an RSVP LSP (Resource Reservation Protocol Label Switched Path tunnel) with an FRR (Fast Re-Route) backup and/or an end-to-end backup LSP within an MPLS network. However, in multi-segment pseudowire applications, protection for the MSPW is typically provided by using a primary MSPW and one or more secondary MSPWs on standby in order to provide redundancy.

One of the problems associated with redundant MSPW's is the inability of mobile backhaul network operators to confirm whether or not customer demands for high availability are being met. Availability refers to the percentage of time over a year that a link (here the redundant MSPWs) will be operational. High availability typically requires what is called "five nines," which means that the link is operational 99.999% of the time (corresponding to being down less than 5 minutes per year). Network operators must ensure that their network links are able to provide high availability to customers who require it. Normally, network operators are able to monitor their links for failures to determine whether they are meeting the high availability demands of customers.

However, with redundant MSPWs, failures may not always be easily ascertained. For example, if the secondary (standby) MSPW fails, the failure is typically not discovered until the primary MSPW fails and an attempt to switch over to the secondary MSPW is unsuccessful. During the time that the secondary MSPW is down, the availability of the end-to-end connection is reduced, and therefore, may be below the customer's required availability level. There is currently no diagnostic mechanism in place to monitor the availability of the secondary MSPW.

In addition, there is currently no diagnostic tool that can effectively determine the potential causes of a connection with a degraded availability value. For example, instances of single points of failure (SPoF) in the backhaul network can reduce the availability of the redundant end-to-end connection. A SPoF may occur where there is a single link to a Provider Edge (PE) node or when an incremental introduction of an additional link to a cell site for dual homing is not property configured for redundant MSPWs. Such SPoF's create lower availability values for the end-to-end connection, and as such, are important to discover.

Another problem associated with multi-segment pseudowires is the lack of diagnostic mechanisms to identify misconfigurations in class of service (CoS) mappings at switching PE nodes in mobile backhaul networks. Switching PE nodes (S-PEs) are intermediate nodes along the MSPW that stitch together different segments of the MSPW. Since each segment may utilize a different PSN tunneling technology, and the supported CoS levels may differ between different PSN tunneling technologies, the S-PEs must be configured to map the CoS level from one tunneling technology to another tunneling technology. A misconfiguration in the CoS mapping can lead to either under-serving or over-serving cell sites.

An additional problem associated with MSPW's is the lack of diagnostic tools to identify misconfigurations in various clock protocols. For example, clock synchronization protocols used in mobile backhaul networks typically have a set of parameters that can be manually modified. In particular, in the IEEE 1588v2 clock synchronization protocol, the modifiable parameters include the "clock_stratum," "clock_identifier" and "preferred_sync_interval" parameters. If one or more of these parameters is modified to an incorrect value, problems can occur in the clock distribution network. As another example, clock distribution protocols used in mobile backhaul networks typically run master clock selection algorithms to divide the network into clock distribution segments and then create a hierarchy by selecting the master and slave clocks for each segment. This segmenting and hierarchy setting in each segment can be manipulated manually, making the clock distribution protocol vulnerable to errors.

SUMMARY OF THE INVENTION

Embodiments of the present invention provide a network node within an internet protocol (IP)-based mobile backhaul network capable of calculating the availability of multi-segment pseudowires. The network node is coupled to transmit a control message towards a destination node within the IP-based mobile backhaul network over a primary multi-segment pseudowire and a secondary multi-segment pseudowire and to receive respective response messages from intermediate nodes positioned between the network node and the destination node along the primary multi-segment pseudowire and the secondary multi-segment psuedowire. The network node extracts a respective identifier from each of the response messages to determine a respective node identity of each of the intermediate nodes, and calculates a respective individual availability of the primary multi-segment pseudowire and the secondary multi-segment pseudowire based on the node identities of each of the intermediate nodes.

In one embodiment, the control message includes an instruction for each of the intermediate nodes to include a respective node availability in the respective response messages. The network node is able to calculate the respective individual availability of the primary multi-segment pseudowire and the secondary multi-segment pseudowire based on the respective node availability of each of the intermediate nodes.

In another embodiment, the network node retrieves from a centralized database within the IP-based mobile backhaul network a respective node availability of each of the intermediate nodes using the node identities. The network node is able to calculate the respective individual availability of the primary multi-segment pseudowire and the secondary multi-segment pseudowire based on the respective node availability of each of the intermediate nodes.

In a further embodiment, the primary multi-segment pseudowire in combination with the secondary multi-segment pseudowire forms an end-to-end redundant pseudowire connection between the network node and the destination node. The network node is able to calculate the total availability of the end-to-end redundant pseudowire connection from the individual availabilities of each of the primary multi-segment pseudowire and the secondary multi-segment pseudowire.

In yet a further embodiment, the primary multi-segment pseudowire in combination with the secondary multi-segment pseudowire forms an end-to-end semi-redundant pseudowire connection between the network node and the destination node. The network node is able to calculate one or more single points of failure between the network node and the destination node based on the node identities.

In an exemplary embodiment, the control message is a multiprotocol label switching (MPLS) label switched path (LSP) ping virtual circuit verification (VCCV) message and each of the response messages is a MPLS LSP ping VCCV response message. In another exemplary embodiment, the control message is a multiprotocol label switching (MPLS) label switched path (LSP) traceroute virtual circuit verification (VCCV) message with an incremental time to live (TTL) and each of the response messages is a MPLS LSP traceroute VCCV response message. The MPLS LSP traceroute VCCV message may include a switching point TLV (Type, Length, Value) field that includes an instruction for intermediate switching nodes positioned between different segments of the primary and secondary multi-segment pseudowires to respond to the MPLS LSP traceroute VCCV message, which enables the network node to identify the intermediate switching nodes along the primary multi-segment pseudowire and the secondary multi-segment pseudowire.

Embodiments of the present invention further provide a method for calculating the availability of multi-segment pseudowires within an IP-based mobile backhaul network. The method includes transmitting a control message from an originating node towards a destination node within the IP-based mobile backhaul network over a primary multi-segment pseudowire and a secondary multi-segment pseudowire and receiving respective response messages from intermediate nodes positioned between the network node and the destination node along the primary multi-segment psuedowire and the secondary multi-segment psuedowire. The method further includes extracting a respective identifier from each of the response messages to determine a respective node identity of each of the intermediate nodes and calculating a respective individual availability of the primary multi-segment pseudowire and the secondary multi-segment pseudowire based on the node identity of each of the intermediate nodes.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
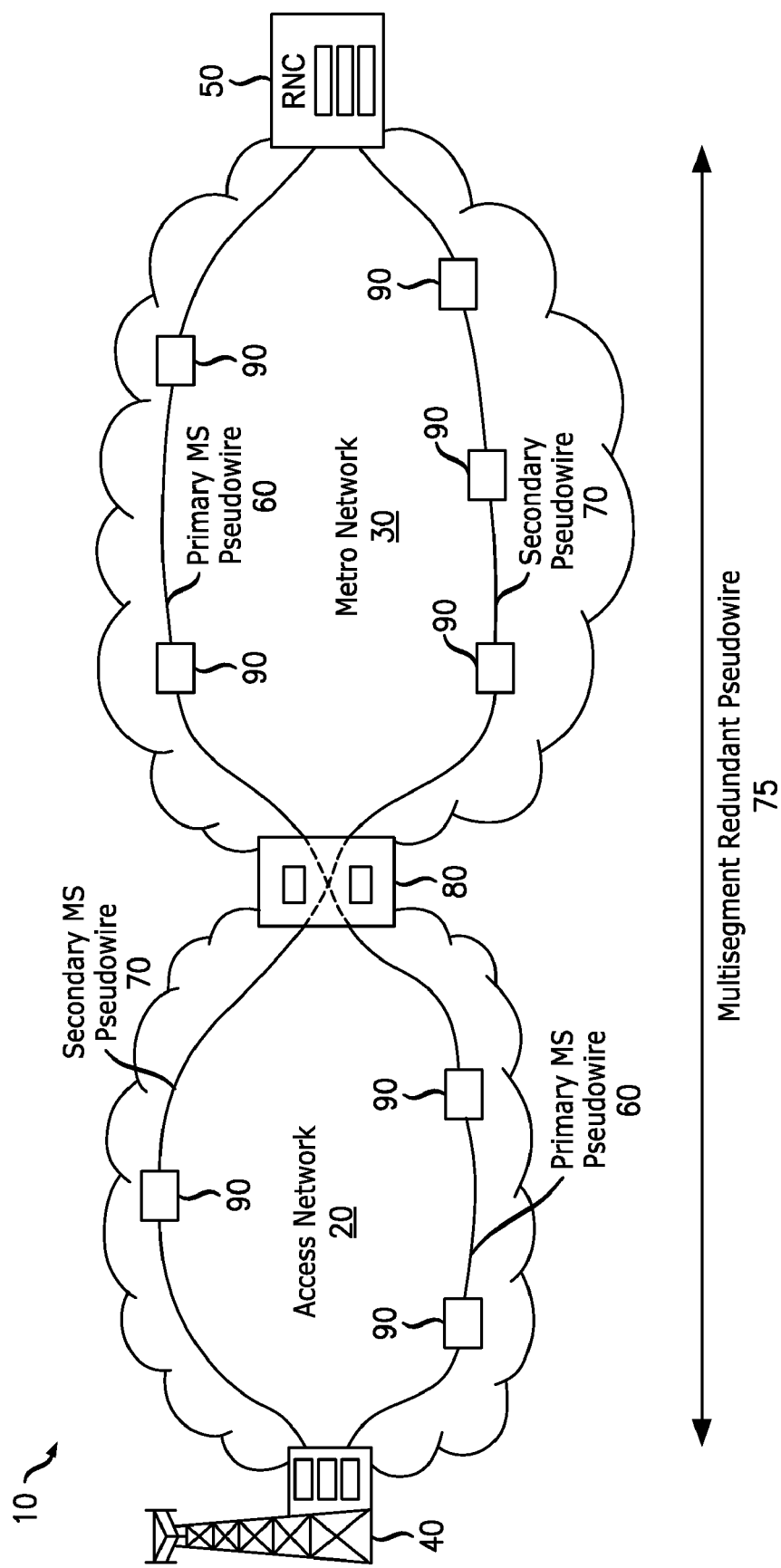
FIG. 1 illustrates an exemplary internet protocol (IP)-based mobile backhaul network with redundant multi-segment pseudowires, in accordance with embodiments of the present invention.

FIG. 1 depicts an exemplary Internet Protocol (IP)-based mobile backhaul network 10 in accordance with embodiments of the present invention. The mobile backhaul network 10 couples a cell site 40 (e.g., a base station or Node B) to a Radio Network Controller (RNC) 50. The RNC is the governing element in a Universal Mobile Telecommunications System (UMTS) radio access network (UTRAN), of which the RNC 50 and base station 40 form a part. The RNC 50 performs radio resource management, mobility management and data encryption for all of the base station's 40 (only one of which is shown) to which the RNC 50 is connected.

The mobile backhaul network 10 is segmented into an access network 20 and a metro network 30 that are connected via intermediate switching node 80. Each network 20 and 30 further includes one or more additional intermediate nodes 90. Thus, base station 40 and RNC 50 are connected via intermediate switching node 80 and one or more additional intermediate nodes 90. Within the IP-based mobile backhaul network 10, the base station 40 and RNC 50 function as terminating Provider Edge (T-PE) nodes, while the intermediate switching node 80 functions as a switching Provider Edge (S-PE) node.

To transport circuit-switched traffic (i.e., legacy voice, data and signaling) between the base station 40 and the RNC 50, multi-segment pseudowires (MSPWs) 60 and 70 are used. Each MSPW 60 and 70 is coupled between the RNC 50 and the base station 40 via the intermediate switching node 80 and one or more respective additional intermediate nodes 90. Each MSPW 60 and 70 operates to emulate the circuit-switched traffic over the packet-switched IP-based mobile backhaul network 10. One of the MSPWs 60 is the primary MSPW that is active for the connection and the other MSPW 70 is the secondary MSPW that remains on standby in case the primary MSPW 60 fails. As such, the primary and secondary MSPWs 60 and 70 together form an end-to-end redundant connection 75 between the base station 40 and the RNC 50.

The redundant MSPW 75 enables a high availability (i.e., at or above five 9's) to be provided to customers of the base station 40. In accordance with embodiments of the present invention, the network operator of the mobile backhaul network 10 is able to monitor the availability of the primary and secondary MSPWs 60 and 70 to ensure that the customer's high availability demands are being satisfied. In particular, the network operator is able to implement an availability tool within the RNC 50 that calculates that availability of the redundant connection 75.

In addition, the network operator is able to implement other diagnostic tools to identify other problems within the mobile backhaul network. For example, the network operator can implement a Class of Service trace tool within the RNC 50 that traces Class of Service (CoS) mappings within the S-PEs 80. As another example, the network operator can implement a clock check tool within the RNC 50 or a Network Management System (NMS) node to ascertain the values of the modifiable clock parameters within all nodes 40, 50, 80 and 90 of the network 10.

Figure 2:
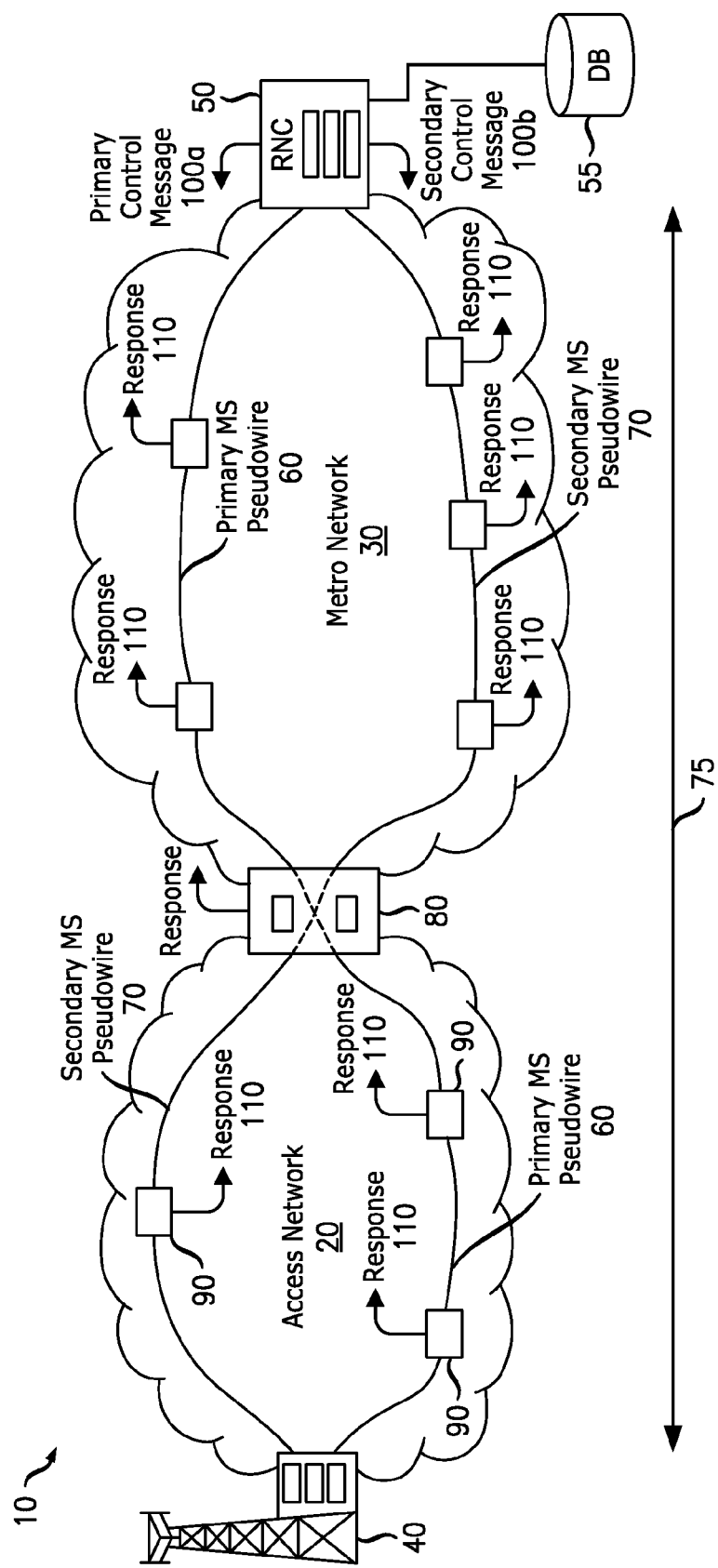
FIG. 2 illustrates an exemplary IP-based mobile backhaul network implementing a diagnostic tool for use in the IP-based mobile backhaul network, in accordance with embodiments of the present invention.

For example, referring now to FIG. 2 of the drawings, to facilitate one or more diagnostic tools within the mobile backhaul network 10, the RNC 50 can be configured to generate and transmit a respective control message 100*a* and 100*b* along the primary and secondary multi-segment pseudowires 60 and 70. The control messages 100*a* and 100*b* solicit appropriate respective response messages 110 from the intermediate nodes 80 and 90 along the primary and secondary multi-segment pseudowires 60 and 70. The information included in the response messages 110 is used by the network operator or RNC 50 to implement a particular diagnostic tool.

For example, in embodiments in which the diagnostic tool is an availability tool, each control message 100*a* and 100*b* is a ping or traceroute message that is transmitted from the RNC 50 towards the base station 40. A "ping" message is typically used for connectivity checks, while a "traceroute" message is typically used for hop-by-hop fault localization or path tracing. However, either type of message can be used in embodiments of the present invention to discover the redundant paths along the end-to-end MSPW connection 75.

The ping or traceroute messages 100*a* and 100*b* cause each intermediate node 80 or 90 along the MSPWs 60 and 70 that receives the ping or traceroute message to respond to the RNC 50 with a ping or traceroute response message 110. Each ping or traceroute response message 110 includes an identity of the intermediate node. For example, when the ping or traceroute message 100*a* sent along the primary multi-segment pseudowire 60 is received at the first intermediate node 90, the first intermediate node 90 generates a ping or traceroute response message 110 with its identity to the RNC 50 and forwards the ping or traceroute message 100*a* to the next intermediate node along the primary multi-segment pseudowire 60.

In an exemplary embodiment, each control message 100*a* and 100*b* is a multiprotocol label switching (MPLS) label switched path (LSP) ping virtual circuit verification (VCCV) message, and each of the response messages 110 is an MPLS LSP ping VCCV response message. VCCV is a fault detection and diagnostic tool for pseudowire applications that provides a control channel between two T-PE nodes in order to verify the connectivity of a pseudowire between the two T-PE nodes. To create the MPLS LSP ping VCCV message, an MPLS LSP ping-type message is encapsulated into a VCCV packet. The VCCV packet is then sent either out-of-band or as in-band traffic with the MSPW's 60 or 70 data. In either case, the VCCV traffic is not forwarded past the destination T-PE (base station 40).

In another exemplary embodiment, each control message 100*a* and 100*b* is a multiprotocol label switching (MPLS) label switched path (LSP) traceroute virtual circuit verification (VCCV) message with an incremental time to live (TTL), and each of the response messages is a MPLS LSP traceroute VCCV response message. The MPLS LSP traceroute VCCV message can further include a switching point TLV (Type, Length, Value) field that includes an instruction for intermediate switching (S-PE) nodes (i.e., node 80) positioned between the different segments of the primary and secondary multi-segment pseudowires to respond to the MPLS LSP traceroute VCCV message to enable the RNC 50 to identify both the intermediate nodes 90 and the intermediate switching nodes 80 along the primary multi-segment pseudowire 60 and the secondary multi-segment pseudowire 70.

Regardless of the type of ping or traceroute messages 100*a* and 100*b*, the response messages 110 are used to identify the intermediate nodes 80 and 90 and links for both the primary and secondary MSPW's 60 and 70. In accordance with embodiments of the present invention, the intermediate node identities can be used by the availability diagnostic tool within the RNC 50 to calculate the individual availability of each of the primary and secondary MSPWs 60 and 70. In particular, the RNC 50 can determine the current node availability of each of the intermediate nodes 80 or 90, and from the current node availabilities, calculate the current availability of each of the primary and secondary MSPWs 60 and 70.

For example, in one embodiment, the RNC 50 can use the node identities to access an external database 55 that maintains the current individual availabilities of each of the intermediate nodes 80 and 90. Based on the node identities received in the ping or traceroute response messages 110, the RNC 50 can retrieve the current node availability of each intermediate node 80 or 90 along the primary and secondary MSPWs 60 and 70 from the database 55. Using the retrieved node availabilities, the RNC 50 can calculate the current availability of the primary and secondary MSPWs 60 and 70. As an example, upon receiving the node identities for each of the four intermediate nodes 90 and the intermediate switching node 80 along the primary MSPW 60, the RNC 50 can access the database 55 to retrieve the current node availability of each of the four intermediate nodes 90 and the intermediate switching node 80. From the retrieved node availabilities, the RNC can calculate the current availability of the primary MSPW 60 as an average of the individual node availabilities.

In another embodiment, the ping or traceroute messages 100*a* and 100*b* further include an additional TLV field that instructs the intermediate nodes 80 and 90 to respond with not only their identity, but also their current availability. In this embodiment, the RNC 50 receives the identities and availabilities directly from the intermediate nodes 80 and 90, and therefore, is able to calculate the primary and secondary MSPW 60 and 70 availabilities without accessing an external database 55.

After the RNC 50 calculates the individual availabilities of the primary and secondary MSPWs 60 and 70, the RNC 50 can then calculate the total availability of the end-to-end redundant connection 75. For example, the RNC 50 can add together the individual availabilities of each of the primary and secondary MSPWs 60 and 70 to determine the total availability of the redundant MSPW connection 75. The total availability can be reported to the network operator of the mobile backhaul network for use in confirming availability requirements to the customer.

However, it should be understood that if a ping or traceroute response message 110 is not received from each node along the primary or secondary MSPW 60 or 70 (i.e., if a response to one of the messages 100*a* or 100*b* is not received from the base station 40), that MSPW 60 or 70 is considered down and the availability of that MSPW 60 or 70 drops to zero. As such, the total availability of the redundant connection 75 is reduced.

The availability tool can be called on-demand to confirm the fact that the customer is experiencing high availability for the connection 75. The availability tool may also be called proactively, intermittently, or periodically to check the availability of the connection 75. In another embodiment, the availability tool can be launched automatically after a failure or recovery event to ascertain whether the failure or recovery has degraded availability in the mobile backhaul network.

Figure 3:
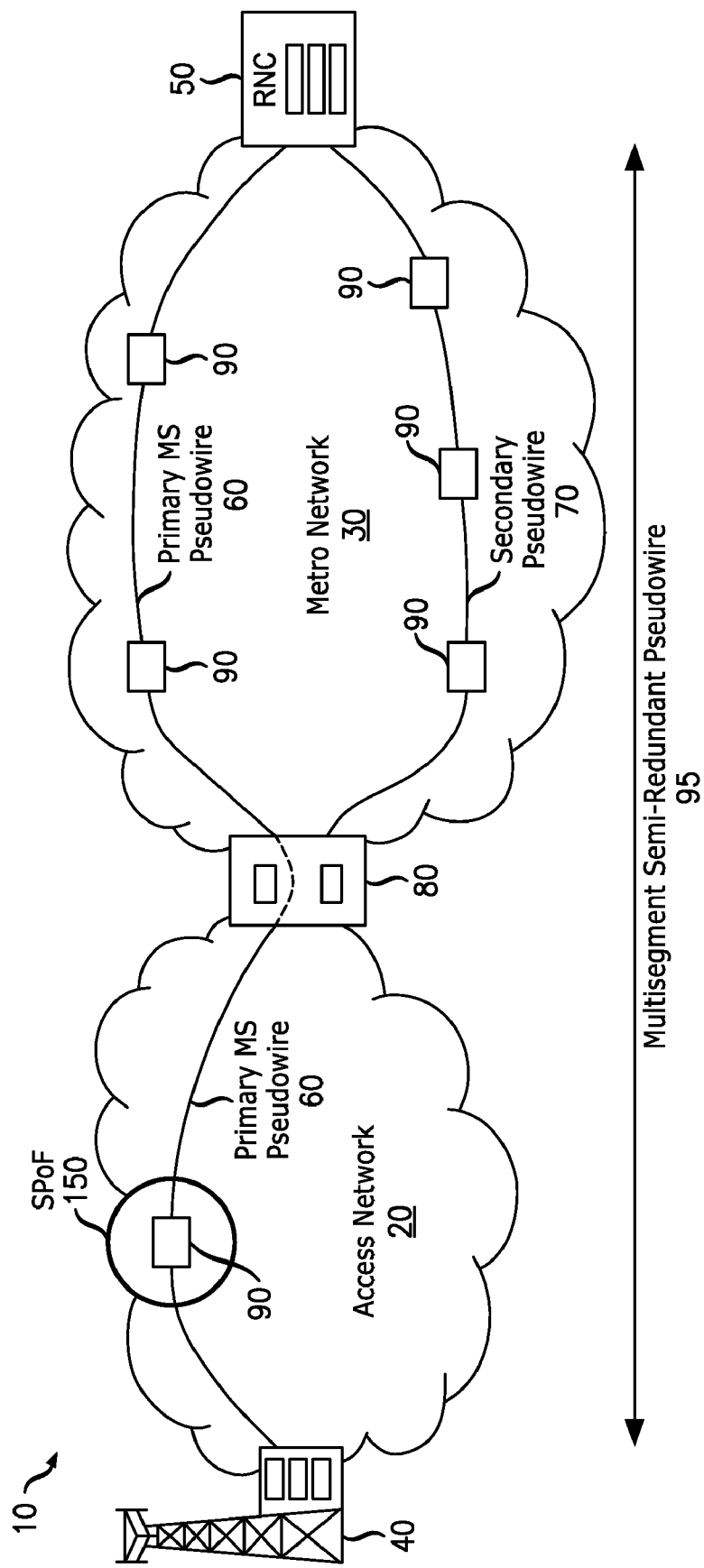
FIG. 3 illustrates an exemplary IP-based mobile backhaul network with a single point of failure, in accordance with embodiments of the present invention.

The availability tool can further be used to identify Single Points of Failure (SPoFs) within the mobile backhaul network 10. For example, referring now to FIG. 3, the secondary pseudowire 70 does not extend into the access network 20, and therefore, does not provide connectivity to the base station 40. As such, a semi-redundant end-to-end connection 95 is formed between the RNC 50 and the base station 40. Based on this topology, as can be seen in FIG. 3, the intermediate node 90 within access network 20 is a SPoF 150 within the mobile backhaul network 10 because if the intermediate node 90 within access network 20 fails, there is no other path that can be used to reach base station 40.

The ping or traceroute message 100*b* (shown in FIG. 2) that is sent along the secondary pseudowire 70 would enable the RNC 50 to identify the SPoF 150 since the last response message 110 to that ping or traceroute message 100*b* would be received from the intermediate switching node 80. The SPoF can be reported to the network operator and used when calculating the total availability of the primary and secondary pseudowires 60 and 70. The SPoF availability tool can also be called on-demand to check if a newly dual-homed connection (by an incremental introduction of a link to a cell site) is still providing a SPoF due to an unintended misconfiguration. The SPoF availability tool may also be called proactively, intermittently or periodically in order to generate regular SPoF reports for a section of interest in the entire network.

Referring again to FIG. 2, in other embodiments in which the diagnostic tool is a Class of Service (CoS) trace tool, each control message 100*a* and 100*b* can be a CoS trace message 100*a* and 100*b* that traces the Class of Service (CoS) mappings in all of the switching PEs (only one of which is shown, node 80) along each MSPW 60 and 70. For example, the trace messages 100*a* and 100*b* can be Label Distribution Protocol (LDP) messages, each with a TLV (Type, Length, Value) field requesting S-PE CoS mapping. The LDP CoS trace messages 100*a* and 100*b* can be forwarded by the S-PEs that receive the messages to other S-PEs along each MSPW 60 and 70, or individual LDP CoS trace messages can be transmitted to each S-PE from the RNC 50. In the latter case, an additional TLV field with the S-PE identity would be included in the LDP CoS trace messages 100*a* and 100*b*. Each S-PE 80 within the mobile backhaul network 10 responds with an LDP response message that includes the S-PE identity and the CoS mapping for that S-PE. The RNC 50 can compare the CoS mappings with each other and/or with known correct CoS mappings stored internally or retrieved from an external database to identify any misconfigurations, and report the identified misconfigurations to the network operator.

In yet another embodiment in which the diagnostic tool is a clock check tool, each control message 100*a* and 100*b* can be a clock query message that checks the values of modifiable clock parameters of master and slave clocks within each PE (terminating and switching) and intermediate node within the mobile backhaul network to identify any misconfigurations in various clock protocols. For example, the IEEE 1588v2 clock synchronization protocol includes several modifiable parameters, such as "clock_stratum," "clock_identifier" and "preferred_sync_interval" parameters. The clock query messages can request the PE and intermediate node master and slave clocks to send the values of these parameters to the RNC 50 or another node, such as a Network Management System (NMS) node (not shown), within the mobile backhaul network. For example, in one embodiment, the clock query messages are "GET" management messages of the clock distribution protocol that are sent in-band from the RNC 50 and between intermediate nodes from master clocks to slave clocks. In another embodiment, the clock query messages are sent out-of-band by the NMS individually to each master and slave clock.

The clock check tool (whether implemented in the RNC 50 or within the NMS) cross-checks the received values of the clock parameters with the correct values and reports any mismatches to the network operator. The clock check tool may be used on-demand where there is an increased number of dropped calls in a particular cell site 40, which can be a manifestation of a misconfigured parameter in the cell site clock, or proactively, intermittently and periodically for maintenance purposes.

The clock check tool can also be used to query the master or slave status of each clock in the mobile backhaul network 10 to build an image of the current master-slave hierarchy. The clock check tool can then cross-check the image with the expected, correct hierarchy and report any discrepancies to the network operator.

Figure 4:
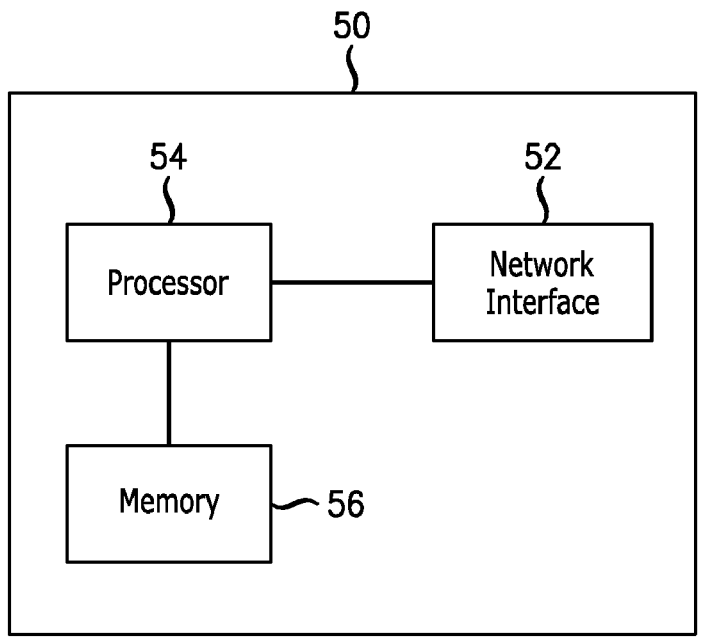
FIG. 4 is a block diagram of an exemplary network node for facilitating diagnostic tools within the IP-based mobile backhaul network, in accordance with embodiments of the present invention.

Turning now to FIG. 4, there is illustrated an exemplary network node 50 within the IP-based mobile backhaul network for facilitating the various diagnostic tools described above, in accordance with embodiments of the present invention. In one embodiment, the network node 50 is a Radio Network Controller (RNC), as shown in FIGS. 1-3. In another embodiment, the network node is a Network Management System (NMS) node.

The network node 50 includes a network interface 52, a processor 54 and a memory 56. The network interface 52 is coupled to the IP-based mobile backhaul network to send and receive messages to and from other network nodes along primary and secondary MSPWs within the IP-based mobile backhaul network. For example, such messages can include the control messages 100*a* and 100*b* and response messages 110 shown in FIG. 2.

The processor 54 may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions stored in memory 56. The memory 56 may be a single memory device or a plurality of memory devices. Such a memory device may be a read-only memory, random access memory, volatile memory, non-volatile memory, static memory, dynamic memory, flash memory, and/or any device that stores digital information, such as operational instructions. Note that when the processor 54 implements one or more of its functions via a state machine, analog circuitry, digital circuitry, and/or logic circuitry, the memory 56 storing the corresponding operational instructions is typically embedded with the circuitry comprising the state machine, analog circuitry, digital circuitry, and/or logic circuitry.

The processor 54 is operable to implement one or more diagnostic tools based on the operational instructions stored in memory 56. For example, the processor 54 can generate the control messages for transmission to other network nodes along primary and secondary MSPWs within the IP-based mobile backhaul network in accordance with the particular diagnostic tool being implemented. In addition, the processor 54 is coupled to provide the control messages to the network interface 52 and to receive the response messages generated by other network nodes responsive to the control messages from the network interface 52.

In embodiments in which the diagnostic tool is an availability tool implemented within an RNC 50, the control messages generated by the processor 54 are ping or traceroute messages that are transmitted from the RNC 50 via network interface 52 towards a base station along the primary and secondary MSPW's coupled between the RNC 50 and base station, and the response messages are ping or traceroute response messages generated by intermediate nodes between the RNC and base station along the primary and secondary MSPWs.

In an exemplary operation, upon receiving the response messages from the network interface 52, the processor 54 extracts a respective identifier from each of the response messages to determine a respective node identity of each of the intermediate nodes, and calculates a respective individual availability of the primary and secondary MSPWs based on the node identity of each of the intermediate nodes. For example, in one embodiment, the processor 54 accesses an external database (not shown) via network interface 52 to determine the current availability of each of the intermediate nodes and uses the current node availabilities to calculate the individual availabilities of the primary and second MSPWs. In another embodiment, the response messages include the current node availabilities of each of the intermediate nodes, and the processor 54 is operable to extract the respective current node availability from each of the response messages for use in calculating the individual availabilities of the primary and secondary MSPWs.

From the individual availabilities of the primary and secondary MSPW's, the processor 54 is further operable to calculate a total availability of the end-to-end redundant pseudowire connection between the RNC and the base station. For example, the processor 54 can add the individual availability of the primary MSPW with the individual availability of the secondary MSPW to determine the total availability of the end-to-end redundant MSPW.

In another embodiment, while implementing the availability tool, the processor 54 can further identify Single Points of Failure (SPoFs) within the mobile backhaul network. In this embodiment, the responses to the ping or traceroute messages can be used by the processor 54 to determine if one or more SPoF's exist along the primary and secondary MSPWs. If the processor 54 identifies one or more SPoF's, the processor can generate a report to be sent to the network operator via network interface 52. In addition, the processor 54 can take the one or more SPoFs into account when calculating the availabilities of the primary and secondary MSPWs.

In embodiments in which the diagnostic tool is a Class of Service (CoS) trace tool, the control messages generated by the processor 54 are CoS trace messages that trace the Class of Service (CoS) mappings in all of the switching Provider Edge (S-PE) nodes along the MSPWs. Each response message received by the processor 54 via network interface 52 includes the S-PE node identity and the CoS mapping for that S-PE node. The processor 54 can compare the CoS mappings to each other and/or to a list of correct CoS mappings stored in memory 56 or retrieved from an external database to identify any misconfigurations.

In embodiments in which the diagnostic tool is a clock check tool, the control messages are clock query messages that check the values of modifiable clock parameters of master and slave clocks within each PE node (terminating and switching) and intermediate node within the mobile backhaul network to identify any misconfigurations in various clock protocols. In one embodiment, the network node 50 is an RNC, and the clock query messages are "GET" management messages of the clock distribution protocol that are sent in-band from the RNC 50 and between intermediate nodes from master clocks to slave clocks. In another embodiment, the network node is a Network Management System (NMS) node and the clock query messages are sent out-of-band by the NMS individually to each master and slave clock within the mobile backhaul network.

The clock query response messages received by the processor 54 via network interface 52 include the current values of various clock parameters of each master and slave clock within the mobile backhaul network. The processor 54 operates to cross-check the received current values of the clock parameters with the correct values stored in memory 56 or retrieved from an external database. For example, in an exemplary embodiment, the response messages indicate whether each clock within each PE node of the mobile backhaul network is a master clock or a slave clock. The processor 54 uses the received master or slave status of each clock to build an image of the current master-slave hierarchy. The processor 54 can then cross-check the image with the correct hierarchy stored in memory 54 or retrieved from an external database to determine if there are any discrepancies.

Figure 5:
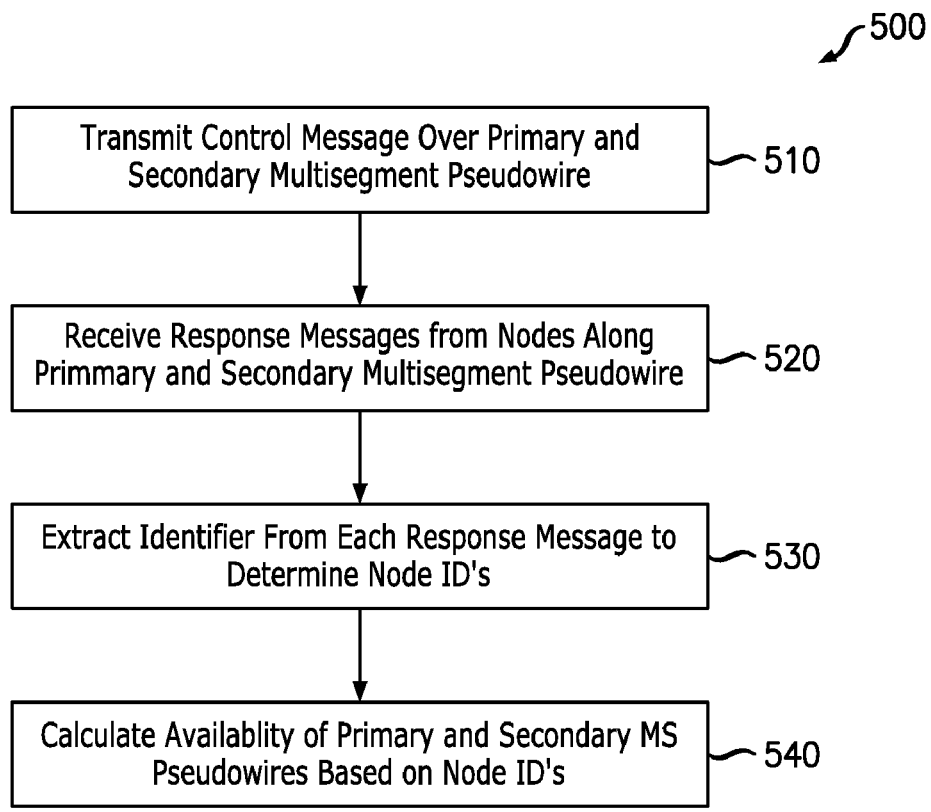
FIG. 5 is a flowchart illustrating an exemplary method for calculating the availability of multi-segment pseudowires within an IP-based mobile backhaul network, in accordance with embodiments of the present invention.

FIG. 5 is a flowchart illustrating an exemplary method 500 for calculating the availability of multi-segment pseudowires (MSPWs) within an IP-based mobile backhaul network, in accordance with embodiments of the present invention. Initially, at block 510, one or more control messages are transmitted over primary and secondary MSPWs coupled between two network nodes (terminating Provider Edge nodes) within the mobile backhaul network. At block 520, response messages responsive to the control messages are received from one or more intermediate nodes along the primary and secondary MSPWs. At block 530, an identifier is extracted from each response message to determine the node identities of each of the intermediate nodes along the primary and secondary MSPWs. Based on the node identities, at block 540, the availability of the primary and secondary MSPWs can be calculated. For example, once the node ID's are determined, the current availability of each node can be ascertained, and the availability of the primary and secondary MSPWs can be calculated based on the individual node availabilities.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A network node for an internet protocol (IP)-based mobile backhaul network, comprising:
    an interface coupled to transmit a control message towards a destination node within the IP-based mobile backhaul network over a primary multi-segment pseudowire and a secondary multi-segment pseudowire and to receive respective response messages from intermediate nodes positioned between the network node and the destination node along the primary multi-segment pseudowire and the secondary multi-segment psuedowire, the control message being a multiprotocol label switching (MPLS) layer 3 message; and
    a processor coupled to receive the response messages and operable to extract a respective identifier from each of the response messages to determine a respective node identity corresponding to one of the intermediate nodes, the processor further operable to calculate a respective individual availability of the primary multi-segment pseudowire and the secondary multi-segment pseudowire based on the node identity of the intermediate nodes.

2. The network node of claim 1, wherein the primary multi-segment pseudowire in combination with the secondary multi-segment pseudowire forms an end-to-end redundant pseudowire connection between the network node and the destination node, and wherein the processor is further operable to calculate a total availability of the end-to-end redundant pseudowire connection from the individual availability of the primary multi-segment pseudowire and the secondary multi-segment pseudowire.

3. The network node of claim 1, wherein the network node is a radio network controller.

4. The network node of claim 1, wherein the destination node is a base station.

5. The network node of claim 1, wherein the control message is a multiprotocol label switching (MPLS) label switched path (LSP) ping virtual circuit verification (VCCV) message and each of the response messages is a MPLS LSP ping VCCV response message.

6. The network node of claim 1, wherein the control message is a multiprotocol label switching (MPLS) label switched path (LSP) traceroute virtual circuit verification (VCCV) message with an incremental time to live (TTL) and each of the response messages is a MPLS LSP traceroute VCCV response message.

7. The network node of claim 6, wherein the MPLS LSP traceroute VCCV message includes a switching point type length value (TLV) field that includes an instruction for intermediate switching nodes positioned between different segments of the primary and secondary multi-segment pseudowires to respond to the MPLS LSP traceroute VCCV message to enable the processor to identify the intermediate switching nodes along the primary multi-segment pseudowire and the secondary multi-segment pseudowire.

8. The network node of claim 1, wherein the control message includes an instruction for each of the intermediate nodes to include a respective node availability in the respective response messages.

9. The network node of claim 8, wherein the processor is operable to calculate the respective individual availability of the primary multi-segment pseudowire and the secondary multi-segment pseudowire based on the respective node availability of the intermediate nodes.

10. The network node of claim 1, wherein the processor is further operable to retrieve from a centralized database within the IP-based mobile backhaul network a respective node availability of ones of the intermediate nodes using the node identities, and wherein the processor is operable to calculate the respective individual availability of the primary multi-segment pseudowire and the secondary multi-segment pseudowire based on the respective node availability of the intermediate nodes.

11. The network node of claim 1, wherein the primary multi-segment pseudowire in combination with the secondary multi-segment pseudowire forms an end-to-end semi-redundant pseudowire connection between the network node and the destination node, and wherein the processor is further operable to calculate one or more single points of failure between the network node and the destination node based on the node identities.

12. The network node of claim 1, wherein the primary multi-segment pseudowire and the secondary multi-segment pseudowire each emulate a link between the network node and the destination node to provide respective IP tunnels between the network node and the destination node.

13. A method for calculating the availability of multi-segment pseudowires within an IP-based mobile backhaul network, comprising:
   transmitting a control message from an originating node towards a destination node within the IP-based mobile backhaul network over a primary multi-segment pseudowire and a secondary multi-segment pseudowire, the control message being a multiprotocol label switching layer 3 message;
   receiving a respective response message from at least one intermediate node positioned between the network node and the destination node along the primary multi-segment pseudowire and the secondary multi-segment psuedowire;
   extracting a respective identifier from each of the response messages to determine a respective node identity of the intermediate nodes; and
   calculating a respective individual availability of the primary multi-segment pseudowire and the secondary multi-segment pseudowire based on the node identity of the intermediate nodes.

14. The method of claim 13, wherein the primary multi-segment pseudowire in combination with the secondary multi-segment pseudowire forms an end-to-end redundant pseudowire connection between the network node and the destination node, and further comprising:
   calculating a total availability of the end-to-end redundant pseudowire connection from the individual availability of the primary multi-segment pseudowire and the secondary multi-segment pseudowire.

15. The method of claim 13, wherein the control message is a multiprotocol label switching (MPLS) label switched path (LSP) ping virtual circuit verification (VCCV) message and each of the response messages is a MPLS LSP ping VCCV response message.

16. The method of claim 15, wherein the control message is a multiprotocol label switching (MPLS) label switched path (LSP) traceroute virtual circuit verification (VCCV) message with an incremental time to live (TTL) and each of the response messages is a MPLS LSP traceroute VCCV response message.

17. The method of claim 16, wherein the MPLS LSP traceroute VCCV message includes a switching point type length value (TLV) field that includes an instruction for intermediate switching nodes to respond to the MPLS LSP traceroute VCCV message with a respective switching node identity that identifies the respective intermediate switching node along the primary multi-segment pseudowire and the secondary multi-segment pseudowire, and wherein the step of calculating further comprises:
   calculating a respective individual availability of the primary multi-segment pseudowire and the secondary multi-segment pseudowire based on the respective node identity of the intermediate nodes and the respective switching node identity of the intermediate switching nodes.

18. The method of claim 13, wherein the control message includes an instruction for the intermediate nodes to include a respective node availability in the respective response message, and wherein the step of calculating further comprises:
   calculating the respective individual availability of the primary multi-segment pseudowire and the secondary multi-segment pseudowire based on the respective node availability of the intermediate nodes.

19. The method of claim 13, wherein the step of calculating further comprises:
- retrieving from a centralized database within the IP-based mobile backhaul network a respective node availability of ones the intermediate nodes using the node identities; and
- calculating the respective individual availability of the primary multi-segment pseudowire and the secondary multi-segment pseudowire based on the respective node availability of the intermediate nodes.

20. The method of claim 13, wherein the primary multi-segment pseudowire in combination with the secondary multi-segment pseudowire forms an end-to-end semi-redundant pseudowire connection between the network node and the destination node, and further comprising:
- calculating one or more single points of failure between the network node and the destination node based on the node identities.

* * * * *